United States Patent
Peterson et al.

(10) Patent No.: US 6,652,105 B1
(45) Date of Patent: Nov. 25, 2003

(54) REFLECTIVE LIGHT VALVE-BASED MULTIMEDIA PROJECTOR EMPLOYING A PATTERNED-SILVERED MIRROR

(75) Inventors: Mark Peterson, Lake Oswego, OR (US); Jeffrey A. Gohman, Hillsboro, OR (US)

(73) Assignee: InFocus Corporation, Wilsonville, OR (US)

(*) Notice: Subject to any disclaimer, the term of this patent is extended or adjusted under 35 U.S.C. 154(b) by 0 days.

(21) Appl. No.: 10/000,171

(22) Filed: Nov. 30, 2001

(51) Int. Cl.⁷ .............................................. G03B 21/28
(52) U.S. Cl. ...................................... 353/98; 348/771
(58) Field of Search ........................... 353/98, 99, 31, 353/34, 37; 348/742, 743, 771; 345/31, 32, 108

(56) References Cited

U.S. PATENT DOCUMENTS 5,379,081 A * 1/1995 Kim et al. ................... 353/99
5,555,041 A * 9/1996 Manabe ....................... 353/37
6,129,437 A 10/2000 Koga et al. ................... 353/98
6,179,425 B1 * 1/2001 De Vaan ....................... 353/38

* cited by examiner

*Primary Examiner*—William Dowling
(74) *Attorney, Agent, or Firm*—Schwabe, Williamson & Wyatt, PC

(57) ABSTRACT

Multimedia projectors (90, 120) include a light source (32) for propagating illumination through a color modulator (42) and a light integrating tunnel (94). Lenses (100, 106) image the integrated light through a patterned-silvered mirror (104, 126) and onto a micromirror display device (MDD) (76, 122). Micromirrors in the MDD that are tilted to an image-forming angle, reflect the image-forming light back toward the patterned-silvered mirror, which propagates the image-forming light toward a projection lens (110). The patterned-silvered mirror includes an accurately positioned boundary separating transparent (102, 116, 128) and reflective (108, 124) portions, resulting in improved contrast of the projected image.

26 Claims, 3 Drawing Sheets

REFLECTIVE LIGHT VALVE-BASED MULTIMEDIA PROJECTOR EMPLOYING A PATTERNED-SILVERED MIRROR

RELATED APPLICATIONS

Not Applicable

FEDERALLY SPONSORED RESEARCH OR DEVELOPMENT

Not Applicable

TECHNICAL FIELD

This invention relates to video and multimedia projectors and more particularly to a patterned-silvered mirror for propagating illumination toward a micro-electromechanical display device ("MDD") and reflecting image bearing light rays emanating from the MDD toward a projection lens.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction. Such multimedia projection systems typically receive from a personal computer ("PC") analog video signals representing still, partial-, or full-motion display images that are converted into digital video signals for controlling a digitally driven imageforming device, such as an MDD, a common type of which is a digital micromirror device. MDD-based projectors are popular because the MDD is a very efficient, albeit expensive, display device. Accordingly, MDDs are typically employed in single light path, frame sequential color projector configurations. An example of such a projector is the model LP130 manufactured by In Focus Corporation, Wilsonville, Oreg., the assignee of this application.

Significant effort has been invested into developing light-weight, portable multimedia projectors that produce bright, high-quality, color images. However, the weight, size, and optical performance of such projectors is often less than satisfactory. For example, suitable projected images having adequate brightness are difficult to achieve, especially when using compact portable color projectors in a well-lighted room.

FIG. 1, shows a typical prior art multimedia projector 30 in which a light source 32 propagates polychromatic light along an optical path 34 including a condenser lens 40, a color wheel 42, a light integrating tunnel 44, a planar fold mirror 46, a relay lens 48, an MDD 50, and a projection lens 52. One or two field lenses (not shown) typically follow light integrating tunnel 44. A display controller 56 receives color image data from a PC 58 and processes the image data into frame sequential red, green, and blue image data, sequential frames of which are conveyed to MDD 50 in proper synchronism with the rotating angular position of color wheel 42. Display controller 56 controls MDD 50 such that light propagating from relay lens 48 is selectively reflected by MDD pixel mirrors either toward projection lens 52 or toward a light-absorbing surface 66.

To achieve adequate projected image brightness and uniformity, light integrating tunnel 44 collects light exiting color wheel 42 and homogenizes the light during propagation through tunnel 44 to an output aperture 72. The uniformly bright rectangular light bundle exiting output aperture 72 propagates through the field lenses, reflects off fold mirror 46, and is imaged by relay lens 48 onto MDD 50.

Other workers have tried making simpler single path MDD-based projectors. For example, U.S. Pat. No. 6,129,437 for IMAGE DISPLAY APPARATUS describes a similar MDD-based projector in which a concave mirror combines the functions of planar fold mirror 46 and relay lens 48 to simplify the optical path of the projector. While this is an improvement over other optical path configurations, employing mirrors in an MDD light path is not without its problems.

FIG. 2 reveals a source of such problems. An MDD 76 includes an array of micromirrors that each pivot about a hinge axis 78 that, in this embodiment, is parallel to an edge margin of MDD 76. MDD 76 receives an incident light bundle 80 and reflects a reflected light bundle 82, the centers of which are separated by an angle 84 corresponding to the mirror tilt angle range of MDD 76. To achieve the maximum possible projected brightness, incident light bundle 80 and reflected light bundle 82 should each have a low f/#, which results in bundles 80 and 82 almost touching at their closest points. This means that the optical components separating incident light bundle 80 from reflected light bundle 82 must have a sharp cutoff to prevent unwanted spillover of incident light into the reflected light bundle. Such light spillover causes a reduction in contrast ratio of the projected display.

There are several reasons why mirrors are disadvantageous for separating incident light bundles from reflected light bundles in an MDD-based projector. The mirror edge margins are often carefully shaped and positioned to reflect one light bundle while not blocking the other light bundle. The edge shaping is often a curved contour shaped to accommodate the light bundle shapes, projection lens barrel, and folded light paths typically found in compact projectors. Planar mirrors are typically shaped by a "scribe and break" process, which is unreliable for curved breaks. Concave mirrors may also be aspherical, and are shaped by expensive grinding and polishing processes. Both planar and concave mirrors typically have an extra edge margin to accommodate the larger tolerance of the manufacturing processes. Clearly, these manufacturing and adjustment processes work against providing a sharp cutoff between the incident and reflected light bundles.

What is still needed, therefore, is a means of simplifying the optical path of a light-weight, portable projector without reducing the projected image contrast ratio.

SUMMARY OF THE INVENTION

An object of this invention is, therefore, to provide an apparatus and a method for improving the compactness, brightness, and contrast ratio of a MDD-based multimedia projector.

Another object of this invention is to provide improved mirrors for use in MDD-based multimedia projectors.

A first preferred embodiment of this invention provides a multimedia projector including a light source for propagating intense illumination through a color modulator. Light exiting the color modulator enters an input aperture of a light integrating tunnel. The light propagates by multiple internal reflection through the light integrating tunnel and exits through an output aperture. Field lenses image light from the output aperture through a transparent portion of a patterned-silvered mirror, through an optional field lens, and onto the micromirror array in an MDD. Micromirrors in the MDD that are tilted to an image-forming angle, reflect the imageforming light back toward a reflective portion of the patterned-silvered mirror, which reflects the image-forming light through a projection lens. In this embodiment, a linear boundary separates the transparent and reflective portions of the patterned-silvered mirror. The reflective portion is formed by depositing a metallic or dielectric coating, which is accurately positioned by masking and formed by conventional processes. This eliminates the need for either an edge-grinding process or a scribe-and-break process and results in a less costly mirror having a very sharp, well controlled boundary. The sharp cutoff prevents or reduces unwanted spillover of an incident light bundle into a reflected light bundle.

A second preferred embodiment of this provides a multimedia projector including a light source for propagating intense illumination through a color modulator and light integrating tunnel as before, but is configured for off-axis illumination of an MDD having an array of diagonally hinged micromirrors. Field lenses image the light from the light integrating tunnel by reflection off a reflective portion another patterned-silvered mirror, through the optional field lens, and onto the MDD. Micromirrors in the MDD that are tilted to an image-forming angle, reflect the image-forming light back through the optional field lens toward a transparent portion of the patterned-silvered mirror, which propagates the image-forming light through the projection lens. In this embodiment, a nonlinear boundary separates the reflective and transparent portions and further includes portions non-parallel to an edge margin of the patterned-silvered mirror. Moreover, the boundary may follow a predetermined curvature to simplify mirror mounting, improve the cutoff between the incident and reflected light bundles, and conform to the geometric shapes of the light bundles.

The patterned-silvered mirrors of this invention are less costly, easier to manufacture, mount, and adjust, and provide a higher contrast projected image by reducing the amount of spillover, scattered, and flat state light entering the projection lens.

Additional objects and advantages of this invention will be apparent from the following detailed description of preferred embodiments thereof that proceed with reference to the accompanying drawings.

DETAILED DESCRIPTION OF PREFERRED EMBODIMENTS

An MDD-based multimedia projector typically employs an arc lamp, a color modulator, a light integrator, and optics, to illuminate the MDD. The MDD employs illumination in which incident and reflected light bundles are angularly separated by an amount determined by the micromirror tilt angle about a micromirror hinge axis. Thus, in an MDD in which the micromirrors have a ±10° tilt angle, the incident and reflected light bundles would be angularly separated about the hinge axis by 20°. This angular separation limits the conical angles available for the incident and reflected light bundles and, therefore, limits the illumination f/# and defines a practical entrance pupil f/# for the projection lens. Incident light reflected by each micromirror in the MDD is either directed through a projection lens or into a dump light area depending on the tilt angle of the micromirror. The micromirrors also have a deactivated, or flat state that they pass through while switching between the two deflected states. The MDD also has a window through which the incident and reflected light passes, which window also reflects flat state light as a first surface reflection.

Figure 3:
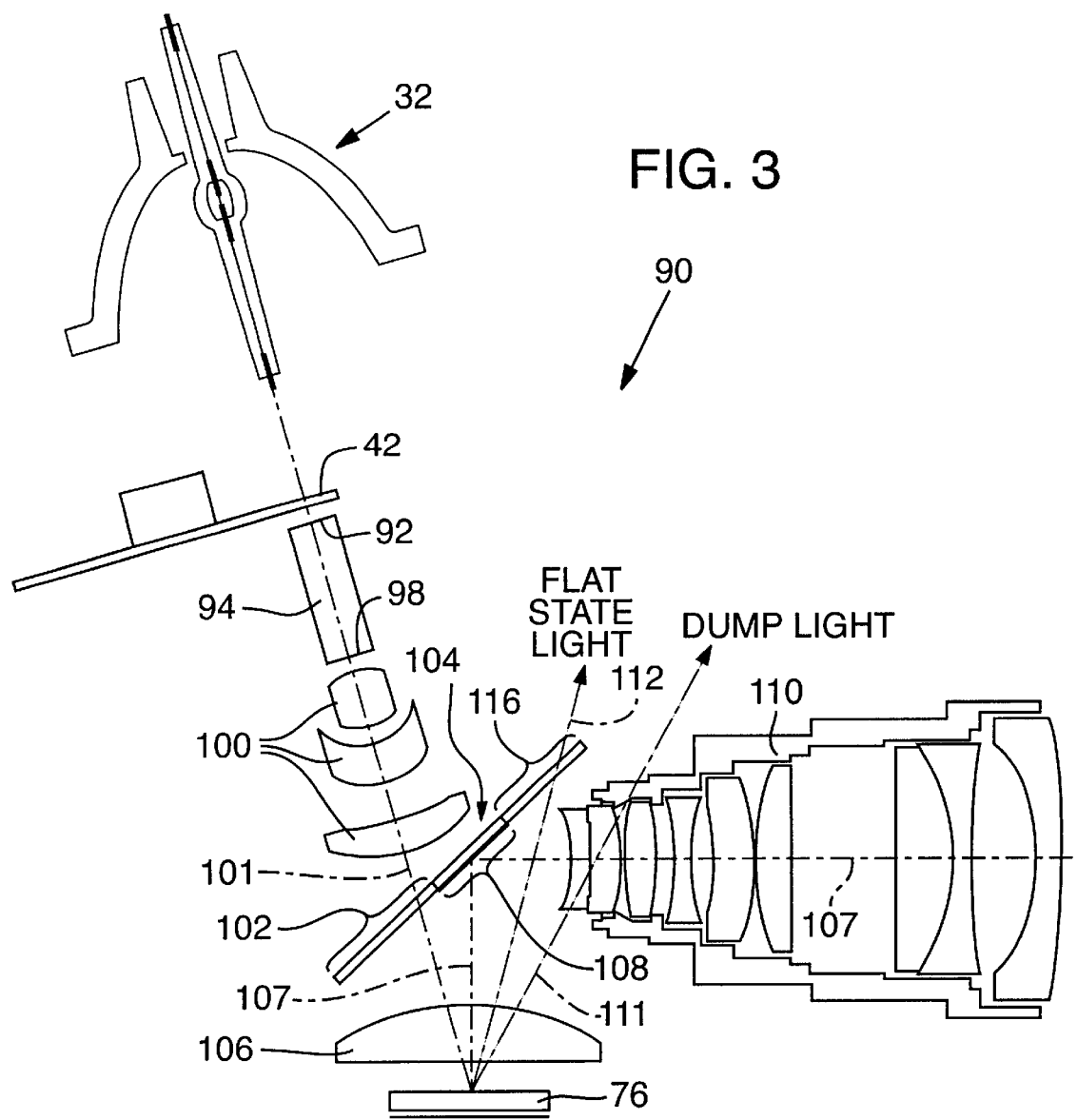
FIG. 3 is a simplified sectional plan view of a first embodiment of an MDD-based multimedia projector employing a patterned-silvered mirror of this invention.

FIG. 3 shows a first preferred embodiment of this invention in which a multimedia projector 90 includes conventional light source 32 for propagating intense illumination through a color modulator, such as color wheel 42. Light exiting color wheel 42 enters an input aperture 92 of a light integrating tunnel 94. The light propagates by multiple internal reflection through light integrating tunnel 94 and exits through an output aperture 98. Output aperture 98 preferably has an aspect ratio that matches the aspect ratio of MDD 76, which is typically 4:3. Field lenses 100 image an incident light bundle 101 from output aperture 98 through a transparent portion 102 of a patterned-silvered mirror 104, through an optional field lens 106, and onto the micromirror array in MDD 76. Micromirrors in MDD 76 that are tilted to an image-forming angle, reflect an image-forming light bundle 107 back through optional field lens 106 toward a reflective portion 108 of patterned-silvered mirror 104, which reflects image-forming light bundle 107 through a projection lens 110. Micromirrors in MDD 76 that are tilted to a light-dumping angle, reflect a dump light bundle 111 back through optional field lens 106 at an angle away from patterned-silvered mirror 104. A flat state light bundle 112 is reflected at an intermediate angle through patterned-silvered mirror 104 as described below in more detail.

Figure 4:
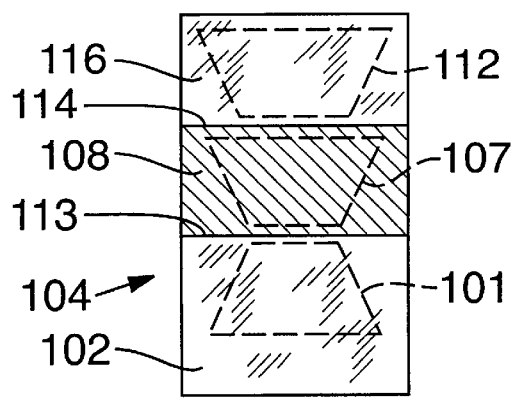
FIG. 4 is a simplified plan view of the patterned-silvered mirror of FIG. 3.

FIG. 4 shows patterned-silvered mirror 104 in more detail. In this embodiment, a pair of linear boundaries 113 and 114 separate reflective portion 108 from transparent portion 102 and another transparent portion 116. Transparent portions 102 and 116 preferably include an anti-reflective coating. Reflective portion 108 is preferably formed by depositing a metallic or dielectric coating on patterned-silvered mirror 104. The coatings are accurately positioned and formed by some combination of conventional masking, etching, deposition, sputtering, screening, or firing processes. This eliminates the need for either an edge-grinding process or a scribe-and-break process and results in a less costly mirror having very sharp, well controlled linear boundaries 113 and 114. The sharp cutoff prevents or reduces unwanted spillover of incident light bundle 101 and flat state light bundle 112 into image-forming light bundle 107, the cross-sectional profiles of which are shown in phantom lines.

The resulting separations between reflective portion 108 and transparent portions 102 and 116 may be non-parallel to an edge margin of patterned-silvered mirror 104, non-parallel to each other, or follow a predetermined curvature to simplify mirror mounting, improve the cutoff between the incident image-forming, and flat state light bundles, and conform to the geometric cross-sectional shapes of the light bundles. These benefits provide a higher contrast projected image by reducing the amount of spillover, scattered, and flat state light entering projection lens 110. Also, patterned-silvered mirror 104 can have curvature on one or both of its major surfaces to support imaging or illumination, thereby eliminating the need for at least one of field lenses 100 and 106.

MDD 76 is somewhat idealized because typical commercially available reflective display devices, such as MDD 50 (FIG. 1) have micromirror arrays that pivot parallel to a hinge axis that is diagonal to an edge margin of the MDD, thereby requiring off-axis illumination in which the incident and reflected light bundles are obliquely and angularly separated.

Figure 5:
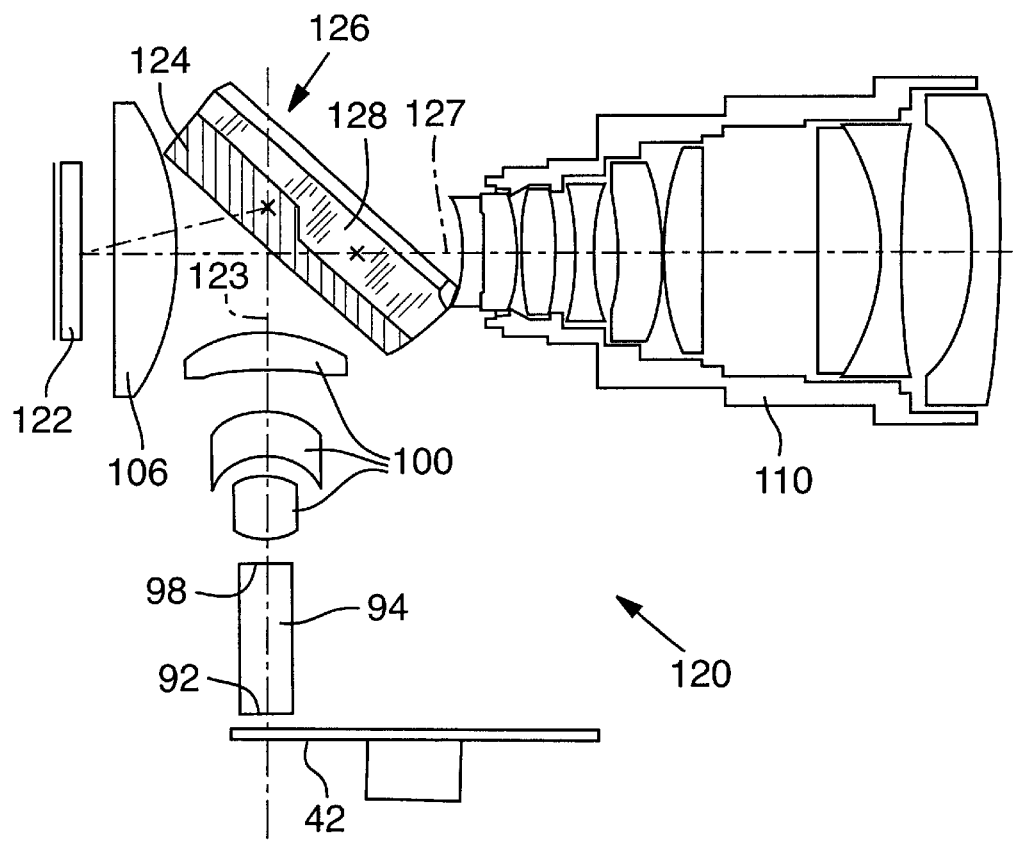
FIG. 5 is a simplified sectional plan view of a second embodiment of an MDD-based multimedia projector employing a patterned-silvered mirror of this invention.
Figure 5:
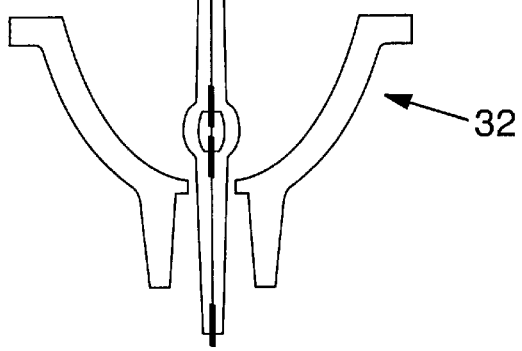

Accordingly, FIG. 5 shows a second preferred embodiment of this invention in which a multimedia projector 120 includes conventional light source 32 for propagating intense illumination through a color modulator, such as color wheel 42. Light exiting color wheel 42 enters input aperture 92 of light integrating tunnel 94. The light propagates by multiple internal reflection through light integrating tunnel 94 and exits through output aperture 98. As before, output aperture 98 preferably has an aspect ratio that generally matches the aspect ratio of an off-axis illuminated MDD 122, but preferably has an asymmetrical shape to compensate for the resulting oblique illumination of MDD 122. Field lenses 100 image an incident light bundle 123 propagating from asymmetrical output aperture 98 by reflection off a reflective portion 124 of a patterned-silvered mirror 126, through optional field lens 106, and onto the micromirror array in MDD 122. Micromirrors in MDD 122 that are tilted to an image-forming angle, reflect an image-forming light bundle 127 back through optional field lens 106 toward a transparent portion 128 of patterned-silvered mirror 126, which propagates image-forming light bundle 127 through projection lens 110. As in the first embodiment, micromirrors in MDD 122 that are tilted to a light-dumping angle, reflect a dump light bundle (not shown) back through optional field lens 106 at an angle away from projection lens 110. A flat light bundle (not shown) is also reflected away from projection lens 110.

Figure 6:
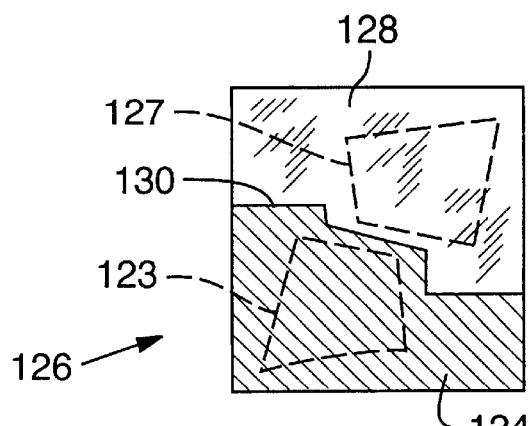
FIG. 6 is a simplified plan view of the patterned-silvered mirror of FIG. 5.

FIG. 6 shows patterned-silvered mirror 126 in more detail. In this embodiment, a nonlinear boundary 130 separates reflective portion 124 from transparent portion 128. Similar to patterned-silvered mirror 104, transparent portion 128 preferably includes an anti-reflective coating, and reflective portion 124 is preferably formed by depositing a metallic or dielectric coating on patterned-silvered mirror 130. The coatings are accurately positioned and formed as described above and have the same benefits. Again, the sharp cutoff prevents or reduces unwanted spillover of the flat light bundle, dump light bundle, and incident light bundle 123 into image-forming light bundle 127, the cross-sectional profiles of the latter two being shown in phantom lines.

In this embodiment, the separation between reflective portion 132 and transparent portion 128 is not only nonlinear, but includes piecewise linear portions that are non-parallel to an edge margin of patterned-silvered mirror 126. As before, nonlinear boundary 130 may follow a predetermined curvature to simplify mirror mounting, improve the cutoff between the incident and reflected light bundles, and conform to the geometric shapes of the light bundles. Patterned-silvered mirror 126 may further include additional reflective or transparent portions (not shown) separated by boundaries to suit a variety of light path requirements. These features provide a higher contrast projected image by reducing the amount of spillover, scattered, and flat state light entering projection lens 110. Of course, patterned-silvered mirror 126 can have curvature on one or both of its major surfaces to support imaging or illumination, thereby eliminating the need for at least one of field lenses 100 and 106.

Skilled workers will recognize that portions of this invention may be implemented differently from the implementations described above for preferred embodiments. For example, single path, frame sequential color projector embodiments are shown, but the invention is also adaptable to monochrome and multi-path color projection embodiments. Of course, various alternative light source, color modulator, light integration, and lens configurations may be employed.

It will be obvious to those having skill in the art that many changes may be made to the details of the above-described embodiments of this invention without departing from the underlying principles thereof. The scope of this invention should, therefore, be determined only by the following claims.

We claim:

1. An apparatus for projecting an image on a surface, comprising:
   a light source providing an illumination light bundle;
   a mirror including a first portion having a first optical property and at least a second portion having a second optical property different from the first optical property, the first and second portions being separated by a piecewise linear boundary, the mirror receiving the illumination light bundle at the first portion and propagating the illumination light bundle accordingly to the first optical property;
   a reflective display device receiving the illumination light bundle from the first portion of the mirror and reflecting an image-forming light bundle toward the second portion of the mirror, which propagates the image-forming light bundle according to the second optical property; and
   a projection lens receiving the image-forming light bundle from the second portion of the mirror and projecting the image forming light bundle toward the surface.

2. The apparatus of claim 1, in which the first optical property includes transparency and the second optical property includes reflectance.

3. The apparatus of claim 1, in which the first optical property includes reflectance and the second optical property includes transparency.

4. The apparatus of claim 1, in which the at least one of the first and second portions of the mirror include a substantially planar surface.

5. The apparatus of claim 1, in which the mirror includes major surfaces and at least one of the major surfaces includes a curvature that aids in directing the illumination light bundle toward the reflective display device.

6. The apparatus of claim 1, in which the mirror includes major surfaces and at least one of the major surface includes a curvature that aids in directing the image-forming light bundle toward the projection lens.

7. The apparatus of claim 1, in which the reflective display device includes an array of micromirrors that receive the illumination light bundle and in which ones of the micromirrors that are tilted to an image-forming angle reflect the image-forming light bundle toward the second portion of the mirror, and ones of the micromirrors that are tilted to a light-dumping angle reflect a dumped light bundle at angles that substantially prevent its propagation through the projection lens.

8. The apparatus of claim 7, in which the reflective display device reflects a flat light bundle toward the mirror, which propagates the flat light bundle at angles that substantially prevent its propagation through the projection lens.

9. A method for projecting an image on a surface, comprising:
proving an illumination light bundle;
providing a mirror including a first portion having a first optical property and at least a second portion having a second optical property different from the first optical property, the first and second portions being separated by a piecewise linear boundary;
receiving the illumination light bundle at the first portion of the mirror and propagating the illumination light bundle accordingly to the first optical property;
providing a reflective display device;
receiving at the reflective display device the illumination light bundle from the first portion of the mirror;
reflecting from the reflective display device an image-forming light bundle toward the second portion of the mirror;
propagating the image-forming light bundle from the second portion of the mirror according to the second optical property; and
projecting the image forming light bundle toward the surface.

10. The method of claim 9, in which the first optical property includes transparency and the second optical property includes reflectance.

11. The method of claim 9, in which the first optical property includes reflectance and the second optical property includes transparency.

12. The method of claim 9, in which the at least one of the first and second portions of the mirror include a substantially planar surface.

13. The method of claim 9, in which the mirror includes major surfaces and at least one of the major surface includes a curvature that aids in a directing of the illumination light bundle toward the reflective display device.

14. The method of claim 9, in which the mirror includes major surfaces and at least one of the major surfaces includes a curvature that aids in projecting the image-forming light bundle toward the surface.

15. The method of claim 9, in which the reflective display device includes an array of micromirrors that receive the illumination light bundle and in which ones of the micromirrors that are tilted to an image-forming angle reflect the image-forming light bundle toward the second portion of the mirror, and ones of the micromirrors that are tilted to a light-dumping angle reflect a dumped light bundle at angles that substantially prevent its projection toward the surface.

16. The method of claim 15, in which the reflective display device further reflects a flat light bundle toward the mirror, which propagates the flat light bundle at angles that substantially prevent its propagation through the projection lens.

17. An apparatus for projecting an image on a surface, comprising:
a light source providing an illumination light bundle;
a mirror including a first portion having a first optical property and at least a second portion having a second optical property different from the first optical property, the mirror further including major surfaces with at least one of the major surfaces including a curvature, the mirror receiving the illumination light bundle at the first portion and propagating the illumination light bundle accordingly to the first optical property;
a reflective display device receiving the illumination light bundle from the first portion of the mirror and reflecting an image-forming light bundle toward the second portion of the mirror, which propagates the image-forming light bundle according to the second optical property; and
a projection lens receiving the image-forming light bundle from the second portion of the mirror and projecting the image forming light bundle toward the surface.

18. The apparatus of claim 17, in which the first optical property includes transparency and the second optical property includes reflectance.

19. The apparatus of claim 17, in which the first optical property includes reflectance and the second optical property includes transparency.

20. The apparatus of claim 17, in which the first and second portions of the mirror are separated by at least one piecewise linear boundary.

21. The apparatus of claim 17, in which the first and second portions of the mirror are separated by at least one curved boundary.

22. The apparatus of claim 17, in which the at least one of the first and second portions of the mirror include a substantially planar surface.

23. The apparatus of claim 17, in which the curvature aids in directing the illumination light bundle toward the reflective display device.

24. The apparatus of claim 17, in which the curvature aids in directing the image-forming light bundle toward the projection lens.

25. The apparatus of claim 17, in which the reflective display device includes an array of micromirrors that receive the illumination light bundle and in which ones of the micromirrors that are tilted to an image-forming angle reflect the image-forming light bundle toward the second portion of the mirror, and ones of the micromirrors that are tilted to a light-dumping angle reflect a dumped light bundle at angles that substantially prevent its propagation through the projection lens.

26. The apparatus of claim 25, in which the reflective display device further reflects a flat light bundle toward the mirror, which propagates the flat light bundle at angles that substantially prevent its propagation through the projection lens.

* * * * *

UNITED STATES PATENT AND TRADEMARK OFFICE
CERTIFICATE OF CORRECTION

PATENT NO. : 6,652,105 B1
DATED : November 25, 2003
INVENTOR(S) : Peterson et al.

Figure 1:
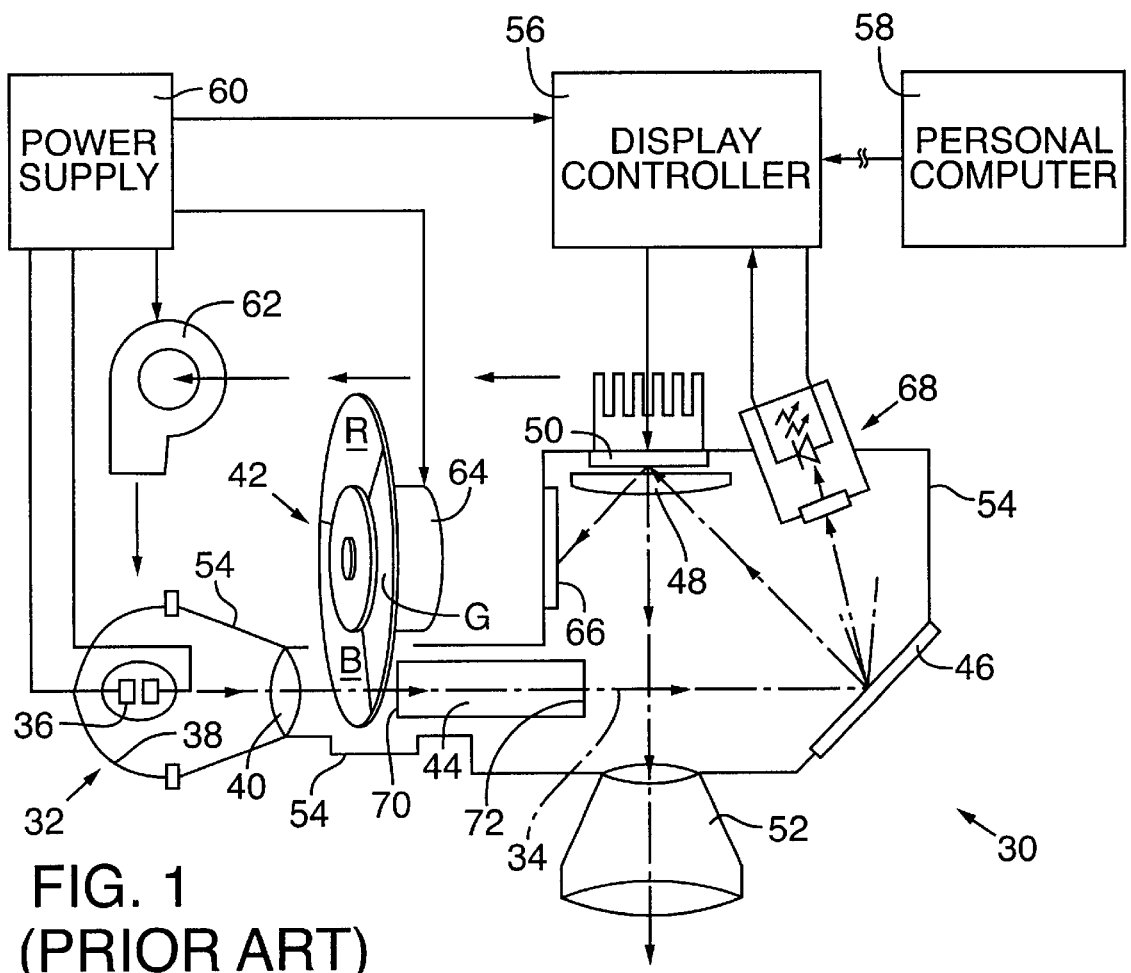
FIG. 1 is a simplified pictorial and electrical block diagram of a prior art multimedia projector showing a light path employing a color wheel, a light integrating tunnel, a planar fold mirror, and relay lens, an MDD, and a projection lens.
Figure 2:
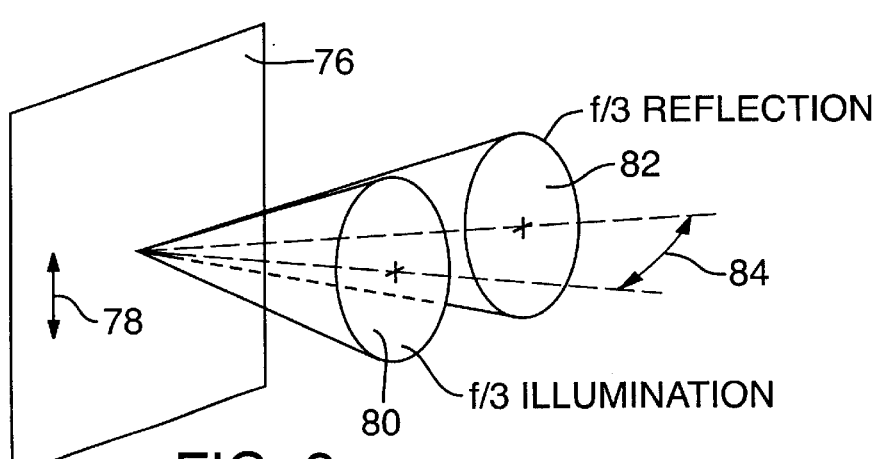
FIG. 2 is an isometric pictorial representation of an MDD receiving an incident light bundle and propagating a reflected light bundle.

It is certified that error appears in the above-identified patent and that said Letters Patent is hereby corrected as shown below:

Column 1,
Line 48, "FIG. 1, shows..." should read -- FIG. 1 shows --.

Column 3,
Line 14, "...this provides..." should read -- this invention provides --.

Column 7,
Line 38, "...one of the major surface..." should read -- one of the major surfaces --.

Signed and Sealed this

Twenty-fifth Day of January, 2005

JON W. DUDAS
*Director of the United States Patent and Trademark Office*